United States Patent
Herrick et al.

(10) Patent No.: US 8,063,916 B2
(45) Date of Patent: *Nov. 22, 2011

(54) GRAPHICS LAYER REDUCTION FOR VIDEO COMPOSITION

(75) Inventors: Jason Herrick, Newark, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 10/961,876

(22) Filed: Oct. 8, 2004

(65) Prior Publication Data

US 2005/0088446 A1    Apr. 28, 2005

Related U.S. Application Data

(60) Provisional application No. 60/513,276, filed on Oct. 22, 2003.

(51) Int. Cl.
*G09G 5/377* (2006.01)
(52) U.S. Cl. .......................... 345/629; 345/589
(58) Field of Classification Search .................. 345/629, 345/589
See application file for complete search history.

(56) References Cited

U.S. PATENT DOCUMENTS

| | | | |
|---|---|---|---|
| 4,020,332 A | 4/1977 | Crochiere et al. | |
| 4,367,466 A | 1/1983 | Takeda et al. | |
| 4,412,294 A | 10/1983 | Watts et al. | |
| 4,481,594 A | 11/1984 | Staggs et al. | |
| 4,532,547 A | 7/1985 | Bennett | |
| 4,679,040 A | 7/1987 | Yan | |
| 4,682,225 A | * 7/1987 | Graham | 375/240.21 |
| 4,688,033 A | 8/1987 | Carini et al. | |
| 4,710,761 A | 12/1987 | Kapur et al. | |
| 4,727,365 A | 2/1988 | Bunker et al. | |
| 4,751,446 A | 6/1988 | Pineda et al. | |
| 4,799,053 A | 1/1989 | Van Aken et al. | |

(Continued)

FOREIGN PATENT DOCUMENTS

EP    0 746 116 A2    12/1996

(Continued)

OTHER PUBLICATIONS

Plaintiff and Counterdefendant Qualcomm Incorporated's Preliminary Invalidity Contentions For U.S. Patent 6,501,480 and 6,570,579, Sep. 1, 2006.

(Continued)

*Primary Examiner* — Javid A Amini
(74) *Attorney, Agent, or Firm* — Thomas, Kayden, Horstemeyer & Risley, LLP

(57) ABSTRACT

A method and system that blend graphics layers and a video layer. The graphics layers may be above and below the video layer, which may be a streaming video. The graphics layers may be stored in memory, blended and stored back in memory. The blended graphics layers may be combined with streaming video and output on a display. Blending the graphics in memory may be done offline and may save processing time and improve real-time combining with streaming video. In an embodiment of the present invention, there may be several layers of graphics below the video layer, and several graphics layers above the video layer. The top graphics layers may be blended into one top graphics layer, and the bottom graphics layers may be blended into one bottom graphics layer. The top and bottom graphics layers may be then blended into one graphics layer and combined with the video layer.

23 Claims, 9 Drawing Sheets

U.S. PATENT DOCUMENTS

| | | |
|---|---|---|
| 4,908,780 A | 3/1990 | Priem et al. |
| 4,954,970 A | 9/1990 | Walker et al. |
| 4,959,718 A | 9/1990 | Bennett |
| 4,967,392 A | 10/1990 | Werner et al. |
| 5,003,299 A | 3/1991 | Batson et al. |
| 5,039,983 A | 8/1991 | Yoon |
| 5,043,714 A | 8/1991 | Perlman |
| 5,065,231 A | 11/1991 | Greaves et al. |
| 5,097,257 A | 3/1992 | Clough et al. |
| 5,142,273 A | 8/1992 | Wobermin |
| 5,146,592 A | 9/1992 | Pfeiffer et al. |
| 5,148,417 A | 9/1992 | Wong et al. |
| 5,155,816 A | 10/1992 | Kohn |
| 5,200,738 A | 4/1993 | Fumotu et al. |
| 5,243,447 A | 9/1993 | Bodenkamp et al. |
| 5,250,928 A | 10/1993 | Kuriki |
| 5,253,059 A | 10/1993 | Ansari et al. |
| 5,254,981 A | 10/1993 | Disanto et al. |
| 5,258,747 A | 11/1993 | Oda et al. |
| 5,262,854 A | 11/1993 | Ng |
| 5,287,178 A | 2/1994 | Acampora et al. |
| 5,301,332 A | 4/1994 | Dukes |
| 5,307,177 A | 4/1994 | Shibata et al. |
| 5,319,742 A | 6/1994 | Edgar |
| 5,327,125 A | 7/1994 | Iwase et al. |
| 5,335,074 A | 8/1994 | Stec |
| 5,371,547 A | 12/1994 | Siracusa et al. |
| 5,371,877 A | 12/1994 | Drako et al. |
| 5,384,912 A | 1/1995 | Ogrinc et al. |
| 5,396,567 A | 3/1995 | Jass |
| 5,396,594 A | 3/1995 | Griffith et al. |
| 5,398,211 A | 3/1995 | Willenz et al. |
| 5,402,181 A | 3/1995 | Jenison |
| 5,404,447 A | 4/1995 | Drako et al. |
| 5,418,535 A | 5/1995 | Masucci et al. |
| 5,422,858 A | 6/1995 | Mizukami et al. |
| 5,430,465 A | 7/1995 | Sabella et al. |
| 5,432,769 A | 7/1995 | Honjo |
| 5,432,900 A * | 7/1995 | Rhodes et al. ............... 715/202 |
| 5,434,683 A | 7/1995 | Sekine et al. |
| 5,434,957 A | 7/1995 | Moller |
| 5,463,728 A | 10/1995 | Blahut et al. ................ 715/807 |
| 5,467,144 A | 11/1995 | Saeger et al. |
| 5,469,223 A | 11/1995 | Kimura |
| 5,471,411 A | 11/1995 | Adams et al. |
| 5,475,400 A | 12/1995 | Sellers et al. |
| 5,479,606 A | 12/1995 | Gray |
| 5,488,385 A | 1/1996 | Singhal et al. |
| 5,515,077 A | 5/1996 | Tateyama |
| 5,526,054 A | 6/1996 | Greenfield et al. |
| 5,532,749 A | 7/1996 | Hong |
| 5,533,182 A | 7/1996 | Bates et al. |
| 5,539,891 A | 7/1996 | Childers et al. |
| 5,546,103 A | 8/1996 | Rhodes et al. |
| 5,550,594 A | 8/1996 | Cooper et al. |
| 5,570,296 A | 10/1996 | Heyl et al. |
| 5,574,572 A | 11/1996 | Malinowski et al. |
| 5,577,187 A | 11/1996 | Mariani |
| 5,579,028 A | 11/1996 | Takeya |
| 5,583,575 A | 12/1996 | Arita et al. |
| 5,592,601 A | 1/1997 | Kelley et al. |
| 5,594,467 A | 1/1997 | Marlton et al. |
| 5,598,525 A | 1/1997 | Nally et al. |
| 5,598,545 A | 1/1997 | Childers et al. |
| 5,600,364 A | 2/1997 | Hendricks et al. |
| 5,600,379 A | 2/1997 | Wagner |
| 5,604,514 A | 2/1997 | Hancock |
| 5,610,942 A | 3/1997 | Chen et al. |
| 5,610,983 A | 3/1997 | Stewart |
| 5,614,952 A | 3/1997 | Boyce et al. |
| 5,615,376 A | 3/1997 | Ranganathan |
| 5,619,270 A | 4/1997 | Demmer |
| 5,619,337 A | 4/1997 | Naimpally |
| 5,621,478 A | 4/1997 | Demmer |
| 5,621,869 A * | 4/1997 | Drews ........................ 345/634 |
| 5,621,906 A | 4/1997 | O'Neill et al. |
| 5,623,311 A | 4/1997 | Phillips et al. |
| 5,625,379 A | 4/1997 | Reinert et al. |
| 5,625,611 A | 4/1997 | Yokota et al. |
| 5,625,764 A * | 4/1997 | Tsujimoto et al. ............ 345/640 |
| 5,631,668 A | 5/1997 | Katsura et al. |
| 5,635,985 A | 6/1997 | Boyce et al. |
| 5,638,499 A * | 6/1997 | O'Connor et al. ............ 345/630 |
| 5,638,501 A | 6/1997 | Gough et al. |
| 5,640,543 A | 6/1997 | Farrell et al. |
| 5,664,162 A | 9/1997 | Dye |
| 5,673,401 A | 9/1997 | Volk et al. |
| 5,694,143 A | 12/1997 | Fielder et al. |
| 5,696,527 A | 12/1997 | King et al. |
| 5,701,365 A | 12/1997 | Harrington et al. |
| 5,706,415 A | 1/1998 | Kelley et al. |
| 5,706,478 A | 1/1998 | Dye |
| 5,706,482 A | 1/1998 | Matsushima et al. |
| 5,708,764 A | 1/1998 | Borrel et al. |
| 5,719,593 A | 2/1998 | De Lange |
| 5,727,084 A | 3/1998 | Pan et al. |
| 5,727,192 A | 3/1998 | Baldwin |
| 5,737,455 A | 4/1998 | Harrington et al. |
| 5,742,779 A | 4/1998 | Steele et al. |
| 5,742,796 A | 4/1998 | Huxley |
| 5,745,095 A | 4/1998 | Parchem et al. |
| 5,745,645 A * | 4/1998 | Nakamura et al. ............ 386/131 |
| 5,748,178 A | 5/1998 | Drewry |
| 5,748,983 A | 5/1998 | Gulick et al. |
| 5,751,979 A | 5/1998 | McCrory |
| 5,754,185 A | 5/1998 | Hsao et al. |
| 5,754,186 A | 5/1998 | Tam et al. |
| 5,757,377 A | 5/1998 | Lee et al. |
| 5,758,177 A | 5/1998 | Gulick et al. |
| 5,761,516 A | 6/1998 | Rostoker et al. |
| 5,764,238 A | 6/1998 | Lum et al. |
| 5,764,243 A | 6/1998 | Baldwin |
| 5,765,010 A | 6/1998 | Chung et al. |
| 5,774,110 A | 6/1998 | Edelson |
| 5,777,629 A | 7/1998 | Baldwin |
| 5,790,134 A | 8/1998 | Lentz |
| 5,790,136 A | 8/1998 | Hoffert et al. |
| 5,790,795 A | 8/1998 | Hough |
| 5,790,842 A * | 8/1998 | Charles et al. ............... 713/600 |
| 5,793,384 A | 8/1998 | Okitsu |
| 5,793,445 A | 8/1998 | Lum et al. |
| 5,802,579 A | 9/1998 | Crary |
| 5,812,210 A | 9/1998 | Arai et al. |
| 5,815,137 A | 9/1998 | Weatherford et al. |
| 5,818,533 A | 10/1998 | Auld et al. |
| 5,828,383 A | 10/1998 | May et al. |
| 5,831,615 A | 11/1998 | Drews et al. |
| 5,831,637 A | 11/1998 | Young et al. |
| 5,838,296 A | 11/1998 | Butler et al. |
| 5,838,389 A | 11/1998 | Mical et al. |
| 5,844,608 A | 12/1998 | Yu et al. |
| 5,847,717 A | 12/1998 | Berry |
| 5,850,232 A | 12/1998 | Engstrom et al. |
| 5,854,761 A | 12/1998 | Patel et al. |
| 5,864,345 A | 1/1999 | Wickstrom et al. |
| 5,867,166 A | 2/1999 | Myhrvold et al. |
| 5,870,622 A | 2/1999 | Gulick et al. |
| 5,874,967 A | 2/1999 | West et al. |
| 5,877,754 A | 3/1999 | Keith et al. |
| 5,883,670 A | 3/1999 | Sporer et al. |
| 5,889,949 A | 3/1999 | Charles |
| 5,894,300 A | 4/1999 | Takizawa |
| 5,894,526 A | 4/1999 | Watanabe et al. |
| 5,896,136 A | 4/1999 | Augustine et al. |
| 5,903,261 A | 5/1999 | Walsh et al. |
| 5,903,277 A | 5/1999 | Sutherland et al. |
| 5,903,281 A | 5/1999 | Chen et al. |
| 5,907,295 A | 5/1999 | Lin |
| 5,907,635 A | 5/1999 | Numata |
| 5,909,559 A | 6/1999 | So |
| 5,912,710 A * | 6/1999 | Fujimoto ..................... 348/445 |
| 5,914,725 A | 6/1999 | MacInnis et al. |
| 5,914,728 A | 6/1999 | Yamagishi et al. |
| 5,917,502 A | 6/1999 | Kirkland et al. |
| 5,920,495 A | 7/1999 | Hicok et al. |
| 5,920,572 A | 7/1999 | Washington et al. |
| 5,920,682 A | 7/1999 | Shu et al. |

| | | | |
|---|---|---|---|
| 5,920,842 A | 7/1999 | Cooper et al. | |
| 5,923,316 A | 7/1999 | Kitamura et al. | |
| 5,923,385 A | 7/1999 | Mills et al. | |
| 5,926,647 A | 7/1999 | Adams et al. | |
| 5,929,872 A | 7/1999 | Greene | |
| 5,936,677 A | 8/1999 | Fries et al. | |
| 5,940,080 A | 8/1999 | Ruehle et al. | |
| 5,940,089 A | 8/1999 | Dilliplane et al. | |
| 5,941,968 A | 8/1999 | Mergard et al. | |
| 5,948,082 A | 9/1999 | Ichikawa | |
| 5,949,432 A | 9/1999 | Gough et al. | |
| 5,949,439 A | 9/1999 | Ben-Yoseph et al. | |
| 5,951,664 A | 9/1999 | Lambrecht et al. | |
| 5,953,691 A * | 9/1999 | Mills | 702/198 |
| 5,956,041 A | 9/1999 | Koyamada et al. | |
| 5,959,626 A | 9/1999 | Garrison et al. | |
| 5,959,637 A | 9/1999 | Mills et al. | |
| 5,960,464 A | 9/1999 | Lam | |
| 5,961,603 A | 10/1999 | Kunkel et al. | |
| 5,963,201 A | 10/1999 | McGreggor et al. | |
| 5,963,222 A | 10/1999 | Cheney et al. | |
| 5,963,262 A | 10/1999 | Ke et al. | |
| 5,973,955 A | 10/1999 | Nogle et al. | |
| 5,977,933 A | 11/1999 | Wicher et al. | |
| 5,977,989 A | 11/1999 | Lee et al. | |
| 5,978,509 A | 11/1999 | Nachtergaele et al. | |
| 5,982,305 A | 11/1999 | Taylor | |
| 5,982,381 A | 11/1999 | Joshi et al. | |
| 5,982,425 A | 11/1999 | Allen et al. | |
| 5,982,459 A | 11/1999 | Fandrianto et al. | |
| 5,987,555 A | 11/1999 | Alzien et al. | |
| 6,002,411 A | 12/1999 | Dye | |
| 6,002,882 A | 12/1999 | Garde | |
| 6,005,546 A | 12/1999 | Keene | |
| 6,006,286 A | 12/1999 | Baker et al. | |
| 6,006,303 A | 12/1999 | Barnaby et al. | |
| 6,008,820 A | 12/1999 | Chauvin et al. | |
| 6,018,803 A | 1/2000 | Kardach | |
| 6,023,302 A * | 2/2000 | MacInnis et al. | 348/597 |
| 6,023,738 A | 2/2000 | Priem et al. | |
| 6,028,583 A | 2/2000 | Hamburg | |
| 6,038,031 A | 3/2000 | Murphy | |
| 6,046,740 A | 4/2000 | LaRoche et al. | |
| 6,057,850 A | 5/2000 | Kichury | |
| 6,061,094 A | 5/2000 | Maietta | |
| 6,061,402 A | 5/2000 | Boyce et al. | |
| 6,064,676 A | 5/2000 | Slattery et al. | |
| 6,067,098 A * | 5/2000 | Dye | 345/531 |
| 6,067,322 A | 5/2000 | Wang | |
| 6,077,084 A | 6/2000 | Mino et al. | |
| 6,078,305 A | 6/2000 | Mizutani | |
| 6,081,297 A | 6/2000 | Lee | |
| 6,081,854 A | 6/2000 | Priem et al. | |
| 6,085,273 A | 7/2000 | Ball et al. | |
| 6,088,045 A | 7/2000 | Lumelsky et al. | |
| 6,088,046 A | 7/2000 | Larson et al. | |
| 6,088,355 A | 7/2000 | Mills et al. | |
| 6,092,124 A | 7/2000 | Priem et al. | |
| 6,094,226 A | 7/2000 | Ke et al. | |
| 6,098,046 A | 8/2000 | Cooper et al. | |
| 6,100,826 A | 8/2000 | Jeon et al. | |
| 6,100,899 A | 8/2000 | Ameline et al. | |
| 6,105,048 A | 8/2000 | He | |
| 6,108,014 A | 8/2000 | Dye | |
| 6,111,896 A | 8/2000 | Slattery et al. | |
| 6,115,422 A | 9/2000 | Anderson et al. | |
| 6,121,978 A | 9/2000 | Miler | |
| 6,124,865 A | 9/2000 | Meinerth et al. | |
| 6,124,878 A | 9/2000 | Adams et al. | |
| 6,125,410 A | 9/2000 | Salbaum et al. | |
| 6,133,901 A | 10/2000 | Law | |
| 6,134,378 A | 10/2000 | Abe et al. | |
| 6,144,392 A | 11/2000 | Rogers | |
| 6,151,030 A | 11/2000 | DeLeeuw et al. | |
| 6,151,074 A | 11/2000 | Werner | |
| 6,157,398 A | 12/2000 | Jeddeloh | |
| 6,157,415 A | 12/2000 | Glen | |
| 6,157,978 A | 12/2000 | Ng et al. | |
| 6,160,989 A | 12/2000 | Hendricks et al. | |
| 6,167,498 A | 12/2000 | Larson et al. | |
| 6,169,843 B1 | 1/2001 | Lenihan et al. | |
| 6,178,486 B1 | 1/2001 | Gill et al. | |
| 6,184,908 B1 | 2/2001 | Chan et al. | |
| 6,189,064 B1 | 2/2001 | MacInnis et al. | |
| 6,189,073 B1 | 2/2001 | Pawlowski | |
| 6,199,131 B1 | 3/2001 | Melo et al. | |
| 6,204,859 B1 | 3/2001 | Jouppi et al. | |
| 6,205,260 B1 | 3/2001 | Crinon et al. | |
| 6,208,350 B1 * | 3/2001 | Herrera | 345/582 |
| 6,208,354 B1 * | 3/2001 | Porter | 345/634 |
| 6,208,671 B1 | 3/2001 | Paulos et al. | |
| 6,208,691 B1 | 3/2001 | Balakrishnan et al. | |
| 6,212,590 B1 | 4/2001 | Melo et al. | |
| 6,215,703 B1 | 4/2001 | Bogin et al. | |
| 6,226,794 B1 | 5/2001 | Anderson et al. | |
| 6,229,550 B1 * | 5/2001 | Gloudemans et al. | 345/641 |
| 6,229,853 B1 | 5/2001 | Gebler et al. | |
| 6,233,634 B1 | 5/2001 | Clark et al. | |
| 6,236,727 B1 | 5/2001 | Ciacelli et al. | |
| 6,239,810 B1 | 5/2001 | Van Hook et al. | |
| 6,252,608 B1 | 6/2001 | Snyder et al. | |
| 6,256,348 B1 | 7/2001 | Laczko et al. | |
| 6,263,019 B1 | 7/2001 | Ryan | |
| 6,263,023 B1 | 7/2001 | Ngai | |
| 6,263,396 B1 | 7/2001 | Cottle et al. | |
| 6,266,072 B1 | 7/2001 | Koga et al. | |
| 6,266,753 B1 | 7/2001 | Hicok et al. | |
| 6,269,107 B1 | 7/2001 | Jong | |
| 6,271,826 B1 * | 8/2001 | Pol et al. | 345/589 |
| 6,271,847 B1 | 8/2001 | Shum et al. | |
| 6,275,507 B1 | 8/2001 | Anderson et al. | |
| 6,281,873 B1 | 8/2001 | Oakley | |
| 6,286,103 B1 | 9/2001 | Maillard et al. | |
| 6,301,299 B1 | 10/2001 | Sita et al. | |
| 6,311,204 B1 | 10/2001 | Mills | |
| 6,313,822 B1 | 11/2001 | McKay et al. | |
| 6,320,619 B1 | 11/2001 | Jiang | |
| 6,326,963 B1 | 12/2001 | Meehan | |
| 6,326,984 B1 | 12/2001 | Chow et al. | |
| 6,327,000 B1 | 12/2001 | Auld et al. | |
| 6,327,002 B1 | 12/2001 | Rinaldi et al. | |
| 6,327,005 B1 | 12/2001 | Han | |
| 6,335,746 B1 | 1/2002 | Enokida et al. | |
| 6,337,703 B1 | 1/2002 | Konar et al. | |
| 6,339,434 B1 | 1/2002 | West et al. | |
| 6,342,892 B1 | 1/2002 | Van Hook et al. | |
| 6,351,471 B1 | 2/2002 | Robinett et al. | |
| 6,351,474 B1 | 2/2002 | Robinett et al. | |
| 6,353,460 B1 | 3/2002 | Sokawa et al. | |
| 6,357,045 B1 | 3/2002 | Devaney | |
| 6,362,827 B1 | 3/2002 | Ohba | |
| 6,369,826 B1 | 4/2002 | Shimotono et al. | |
| 6,369,855 B1 | 4/2002 | Chauvel et al. | |
| 6,373,497 B1 | 4/2002 | McKnight et al. | |
| 6,374,244 B1 | 4/2002 | Shibata | |
| 6,380,945 B1 | 4/2002 | MacInnis et al. | |
| 6,384,831 B1 | 5/2002 | Nakamura et al. | |
| 6,384,840 B1 | 5/2002 | Frank et al. | |
| 6,393,021 B1 | 5/2002 | Chow et al. | |
| 6,400,832 B1 * | 6/2002 | Sevigny | 382/103 |
| 6,408,436 B1 | 6/2002 | De Haas | |
| 6,411,333 B1 | 6/2002 | Auld et al. | |
| 6,421,460 B1 | 7/2002 | Hamburg | |
| 6,426,755 B1 | 7/2002 | Deering | |
| 6,434,319 B1 | 8/2002 | Wine | |
| 6,442,207 B1 | 8/2002 | Choi | |
| 6,448,966 B1 * | 9/2002 | Yet | 345/421 |
| 6,452,641 B1 * | 9/2002 | Chauvel et al. | 348/569 |
| 6,456,335 B1 | 9/2002 | Miura et al. | |
| 6,459,456 B1 | 10/2002 | Oh | |
| 6,466,206 B1 | 10/2002 | Deering | |
| 6,466,210 B1 | 10/2002 | Carlsen et al. | |
| 6,466,220 B1 | 10/2002 | Cesana et al. | |
| 6,466,581 B1 | 10/2002 | Yee et al. | |
| 6,466,624 B1 | 10/2002 | Fog | |
| 6,467,093 B1 | 10/2002 | Inoue et al. | |
| 6,470,100 B2 | 10/2002 | Horiuchi | |
| 6,496,186 B1 | 12/2002 | Deering | |

| | | | |
|---|---|---|---|
| 6,496,228 B1 | 12/2002 | McGee et al. | |
| 6,501,480 B1* | 12/2002 | MacInnis et al. | 345/538 |
| 6,510,554 B1 | 1/2003 | Gordon et al. | |
| 6,518,965 B2 | 2/2003 | Dye et al. | |
| 6,519,283 B1* | 2/2003 | Cheney et al. | 375/240.01 |
| 6,529,284 B1 | 3/2003 | Ganapathy et al. | |
| 6,538,656 B1 | 3/2003 | Cheung et al. | |
| 6,538,658 B1* | 3/2003 | Herrera | 345/582 |
| 6,570,579 B1 | 5/2003 | MacInnis et al. | |
| 6,570,922 B1 | 5/2003 | Wang et al. | |
| 6,573,905 B1 | 6/2003 | MacInnis et al. | |
| 6,636,222 B1 | 10/2003 | Valmiki et al. | |
| 6,661,422 B1 | 12/2003 | Valmiki et al. | |
| 6,662,329 B1 | 12/2003 | Foster et al. | |
| 6,687,302 B2 | 2/2004 | Nakaya | |
| 6,720,976 B1 | 4/2004 | Shimizu et al. | |
| 6,738,072 B1* | 5/2004 | MacInnis et al. | 345/629 |
| 6,771,274 B2* | 8/2004 | Dawson | 345/592 |
| 6,798,420 B1* | 9/2004 | Xie | 345/554 |
| 6,853,385 B1 | 2/2005 | MacInnis et al. | |
| 6,879,330 B2 | 4/2005 | MacInnis et al. | |
| 6,947,050 B2 | 9/2005 | Jeddeloh | |
| 6,987,518 B2* | 1/2006 | Dawson | 345/592 |
| 7,039,245 B1* | 5/2006 | Hamery | 382/233 |
| 7,098,930 B2* | 8/2006 | MacInnis et al. | 345/629 |
| 7,110,006 B2* | 9/2006 | MacInnis et al. | 345/629 |
| 7,310,104 B2* | 12/2007 | MacInnis et al. | 345/629 |
| 7,483,042 B1* | 1/2009 | Glen | 345/629 |
| 7,530,027 B2* | 5/2009 | MacInnis et al. | 715/768 |
| 7,538,783 B2* | 5/2009 | MacInnis et al. | 345/660 |
| 7,545,438 B2* | 6/2009 | MacInnis et al. | 348/441 |
| 7,554,562 B2 | 6/2009 | MacInnis et al. | |
| 2001/0005218 A1 | 6/2001 | Gloudemans et al. | 348/157 |
| 2002/0176506 A1 | 11/2002 | Ferreira Florencio et al. | |
| 2003/0085903 A1 | 5/2003 | Hrusecky et al. | |
| 2003/0133441 A1 | 7/2003 | Watanabe et al. | |
| 2003/0184553 A1* | 10/2003 | Dawson | 345/581 |
| 2003/0190952 A1* | 10/2003 | Smith et al. | 463/30 |
| 2004/0017383 A1* | 1/2004 | Baer et al. | 345/629 |
| 2004/0017398 A1* | 1/2004 | MacInnis et al. | 345/781 |
| 2004/0034874 A1* | 2/2004 | Hord et al. | 725/136 |
| 2004/0049781 A1* | 3/2004 | Flesch et al. | 725/37 |
| 2004/0056874 A1* | 3/2004 | MacInnis et al. | 345/660 |
| 2004/0071453 A1* | 4/2004 | Valderas | 386/125 |
| 2004/0136698 A1* | 7/2004 | Mock | 386/123 |
| 2004/0189676 A1* | 9/2004 | Dischert | 345/639 |
| 2004/0189868 A1* | 9/2004 | Molaro et al. | 348/468 |
| 2004/0207723 A1* | 10/2004 | Davis et al. | 348/14.04 |
| 2004/0257369 A1* | 12/2004 | Fang | 345/501 |
| 2005/0012759 A1* | 1/2005 | Valmiki et al. | 345/629 |
| 2005/0086702 A1* | 4/2005 | Cormack et al. | 725/135 |

FOREIGN PATENT DOCUMENTS

| | | |
|---|---|---|
| EP | 0746116 A2 | 12/1996 |
| EP | 0 752 695 | 1/1997 |
| EP | 0 752 695 A2 | 1/1997 |
| EP | 752695 A2 * | 1/1997 |
| EP | 0 840 276 A2 | 5/1998 |
| EP | 0 840 277 A2 | 5/1998 |
| EP | 0 840 505 | 5/1998 |
| EP | 0 840 505 A2 | 5/1998 |
| EP | 840276 A2 * | 5/1998 |
| EP | 0840276 A2 | 5/1998 |
| EP | 0840277 A2 | 5/1998 |
| EP | 840505 A2 * | 5/1998 |
| EP | 0850462 B1 | 4/2006 |
| GB | 2 287 627 A | 3/1995 |
| GB | 2287627 A | 3/1995 |
| JP | 2000-196586 A | 7/2000 |
| WO | WO 94-10641 | 5/1994 |
| WO | WO 94/10641 | 5/1994 |
| WO | WO 00-28518 | 5/2000 |
| WO | WO 00/28518 | 5/2000 |

OTHER PUBLICATIONS

Thomas Porter & Tom Duff, "Compositing Digital Images", Computer Graphics, vol. 18, No. 3, Jul. 1984, pp. 253-259.

Akeley, K. & Jermoluk T., "High-Performance Polygon Rendering," 22 Computer Graphics No. 4 (ACM Aug. 1988).

Apgar, B., et al., "A Display System for the Stellar Graphics Superconductor Model GS1000," 22 Computer Graphics No. 4 (ACM Aug. 1988).

Asai, M.D., et al., "Novel Architecture for a High Performance Full Custom Graphics Processor," (IEEE 1989).

Awaga, M., et al., "3D Graphics Processor Chip Set," (IEEE Dec. 1995).

Cox, M. & Bhandari, N., "Architectural Implications of Hardware-Accelerated Bucket Rendering on the PC," (Association for Computing Machinery SIGGRAPH/Eurographics Workshop 1997).

Cyrix Corporation Manual, copyrighted 1996, 1997, and all underlying development work.

Deering, M., et al., "The Triangle Processor and Normal Vector Shader: A VLSI System for High Performance Graphics," 22 Computer Graphics No. 4 (ACM Aug. 1998).

Donovan, W., et al., "Pixel Processing in a Memory Controller," (IEEE Computer Graphics and Applications 1995).

Dutton, T., "The Design of the DEC 3000 Model 500 AXP Workstation," (IEEE 1993).

Foley, James, D., et al., "Introduction to Computer Graphics," (Addison-Wesley Publishing Co. 1994) ("Introduction to Computer Graphics").

Galbi, D., et al., "An MPEG-1 Audio/Video Decoder with Run-Length Compressed Antialiased Video Overlays," (1995 IEEE International Solid-State Circuits Conference).

Glaskowsky, Peter, "Cyrix Creates Ultimate CPU for Games," Microprocessor Report, Dec. 8, 1997.

Glaskowsky, Peter, "Intel Displays 740 Graphics Chip: Auburn Sets New Standard for Quality—But Not Speed," Microprocessor Report No. 2, Feb. 16, 1998.

Gwennap, L., "Verite: A Programmable 3D Chip: Rendition Uses Internal RISC CPU for Versatility, Performance," 10 Microprocessor Resort No. 6, May 6, 1996.

Hosotani S., et al., "A Display Processor Conforming to all DTV Formats with 188-TAP FIR Filters and 284 Kb FIFO Memories," (IEEE 1997 (Manuscript received Jun. 13, 1997)).

Knittel, G. & Straber, W., "VIZARD—Visualization Accelerator for Realtime Display," (Association for Computing Machinery SIGGRAPH/Eurographics Workshop 1997).

Lewis, R., et al., "Delivering PCI in HP B-Class and C-Class Workstations: A Case Study in the Challenges of Interfacing with Industry Standards," (Hewlett-Packard Journal May 1998).

Manepally, R. & Sprague, D., "Intel's i750 (R) Video Processor—The Programmable Solution," (IEEE 1991).

McCormack, J., et al., "Neon: A Single-Chip 3D Workstation Graphics Accelerator," (SIGGRAPH Eurograph Workshop Graph Hardware Aug. 31-Sep. 1, 1998).

Norrod, F. & Wawrzynak, R., "A Multimedia-Enhanced x88 Processor, Digest of Technical Papers," ISSCC96 (Feb. 9, 1996).

Oguchi, T., et al., "A Single-Chip Graphic Display Controller," (1981 IEEE International Solid-State Circuits Conference).

Soferman, Z., et al., "Advanced Graphics Behind Medical Virtual Reality: Evolution of Algorithms, Hardware, and Software Interfaces," 86 Proceedings of the IEEE No. 3 (IEEE Mar. 1998 (Manuscript received Jul. 3, 1997)).

Scott, N., et al., "An Overview of the VISUALIZE fx Graphics Accelerator Hardware," (Hewlett-Packard Journal May 1998) and all underlying development work ("HP").

Sumi, M., et al., "A 40-Mpixel/s Bit Block Transfer Graphics Processor," (IEEE 1989).

Foley, James D., et al.; Computer Graphics: Principles and Practice; publication, 1996, 1990; The Systems Programming Series, 4 pages, Second Edition in C; Addison-Wesley Publishing Company, U.S.A.

Tobias, R., "The LR33020 GraphX Processor: A Single Chip X-Terminal Controller," (IEEE 1992).

Watkins, J., et al., A Memory Controller with an Integrated Graphics Processor (IEEE 1993).

Yao, Yong, "Samsung Launches Media Processor: MSP Is Designed for Microsoft's New 3D-Software Architecture," 10 Microprocessor Report No. 11, Aug. 26, 1996.

Yao, Yong, "Competition Heats Up in 3D Accelerators: Market Hungers for a Unified Multimedia Platform from Microsoft," 10 Microprocessor Resort No. 15, Nov. 18, 1996.

Yao, Yong, "Chromatic's Mpact 2 Boosts 3D: Mpact/3000 Becomes First Media Processor to Ship in Volume," 10 Microprocessor Report No. 15, Nov. 18, 1996.

Motorola, Inc. MC92100 "Scorpion" Graphics Display Generator, SDRAM Controller, and Digital Video Encoder, 1997, 6 pages.

Power Tv, Inc., Eagle ™ Graphics/Audio Media Compositor Data Sheet, Version 1.7, Feb. 27, 1997, pp. 63.

Berekovic, M. & Pirsch, P., "Architecture of a Coprocessor Module for Image Compositing," (IEEE 1998).

Blinn, J., "Compositing, Part I: Theory," (IEEE Sep. 1994).

Blinn, Jim; Jim Blinn's Corner Dirty Pixels; publication; 1998; pp. 179-190; Chapter Sixteen; Morgan Kaufmann Publishers, Inc.; San Francisco, CA, U.S.A.

Jaspers, et al., "A Flexible Heterogeneous Video Processor System for Television Applications," (IEEE Sep. 25, 1998).

Li, R., et al., "A Flexible Display Module for DVD and Set-Top Box Applications," (IEEE Transactions on Consumer Electronics Aug. 1997 (Manuscript received Jun. 13, 1997)).

Ostermann, J., "Coding of Arbitrarily Shaped Objects with Binary and Greyscale Alpha-Maps: What Can MPEG-4 Do for You?," (Proceedings of the 1998 IEEE International Symposium on Circuits and Systems, May 31-Jun. 3, 1998, vol. 5).

Stytz, et al., "Three-Dimensional Medical Imaging: Algorithms and Computer Systems," (ACM Computing Surveys, Dec. 1991).

Wang, J. & Adelson, E., "Representing Moving Images with Layers," (IEEE Transactions on Image Processing, Sep. 1994).

Sun, Huifang et al., "A New Approach for Memory Efficient ATV Decoding," 1997 IEEE International Conference on Consumer Electronics, pp. 174-175, Los Angeles, 1997.

Bao, Jay et al., "Hdtv Down-Conversion Decoder," IEEE Transactions on Consumer Electronics, pp. 402-410, vol. 42, No. 3, Aug. 1996.

Mokry, Robert et al., "Minimal Error Drift in Frequency Scalability for Motion-Compensated DCT Coding," IEEE Transactions on Circuits and Systems for Video Technology, pp. 392-406, vol. 4, No. 4, Aug. 1994.

Vetro, Anthony et al., "Minium Drift Architectures for 3-Layer Scalable DTV Decoding," IEEE Transactions on Consumer Electronics, pp. 527-536, vol. 44, No. 3, Aug. 1998.

Lee, Dong-Ho et al., "HDTV Video Decoder Which Can Be Implemented With Low Complexity," IEEE International Conference on Consumer Electronics, pp. 6-7, 1994.

Sun, Huifang, "Hierarchical Decoder for MPEG Compressed Video Data," IEEE Transactions for Consumer Electronics, pp. 559-564, vol. 39, No. 3, Aug. 1993.

Yu, Haoping et al., "Block-Based Image Processor for Memory Efficient MPEG Video Decoding," 1999 IEEE International Conference on Consumer Electronics, pp. 114-115, 1999.

Apple II Video Overlay Card Datasheet, 1989.

McReynolds, T., "Programming with OpenGL: Advanced Techniques," SIGGRAP7-I Course, May 1, 1997.

Randall, M., "Talisman: Multimedia for the PC," IEEE Micro, Mar./Apr. 1997.

S3, Inc. ViRGE/VX Product Overview, Jul. 1996.

SGS-Thomson Microelectronics, NVIDIA RIVA 128, Oct. 1997.

Silicon Graphics, Inc, Indigo2 IMPACT Video Programmer's Guide, Document No. 007-3182-003, 1996.

Silicon Graphics, OCTANE Digital Video Programmer's Guide, Document No. 007-3513-001, 1996.

Silicon Graphics, Inc., Sirius Video Programming and Configuration Guide, Document No. 007-2238-003, 1994.

Torborg, J., et al., "Commodity Real-Time Graphics for the PC," Proc. SIGGRAPH, Assoc. of Computing Machinery, 1996.

TriMedia TM1000 Preliminary Data Book, Philips Electronics North America Corporation, 1997.

Watlington, J., "Video & Graphics Processors: 1997," May 9, 1997.

MC92100, "Scorpion" Graphics Display Generator, SDRAM Controller, and Digital Video Encoder, 1997.

Porter et al., "Compositing Digital Images," vol. 18, No. 3, Computer Graphics, Jul. 1984.

Power TV, Inc., Eagle Graphics/Audio Media Compositor Data Sheet, version 1.7, Feb. 27, 1997.

Wang, J., "Representing Moving Images with Layers," vol. 3, No. 5 IEEE Transactions on Image Processing Special Issue: Image Sequence Compression, Sep. 1994.

Defendant SiRF Technology, Inc.'s Invalidity Contentions with Exhibit B (Redacted), U.S. District Court for the Central District of California, Southern Division, Case No. SACV970546 JVS (MLGx), Sep. 28, 2009.

Opening Expert Report of Dr. Glenn Reinman on Invalidity of United States Patent No. 7,310,104, U.S. District Court for the Central District of California, Southern Division, Case No. SACV080546 JVS (MLGx), Aug. 9, 2010.

Final Order re Special Master's Report and Recommendations Concerning Claim Construction, U.S. District Court for the Central District of California, Southern Division, Case No. SACV080546 JVS (MLGx), Jul. 15, 2010.

Hudson, Scott; Desktop PC-IC Content and Integration Trends, Mar. 1, 1999—Electronic News, http://www.reed-electronics.com/electronicnews/article/CA69496.html.

Brown, Peter; Basic Notebooks Infrastructure In Place-Trident introduces Monterey Chip; Neomagic re-engineering products, Sep. 28, 1998, Electronic News, http://www.findarticles.Com/p/articles/mi_m0EKF/is_n2238_v44/ai_21172858.

Motorola, Inc., MC92100 "Scorpion" Graphics Display Generator, SDRAM Controller, and Digital Video Encoder, 1997 6 pages.

Sun, Huifang et al., "A New Approach for Memory Efficient ATV Decoding," 1997 IEEE International Conference on Consumer Electronics, pp. 174-175, Los Angeles, 1997.

Vetro, Anthony et al., "Minimum Drift Architectures for 3-Layer Scalable DTV Decoding," IEEE Transactions on Consumer Electronics, pp. 527-536, vol. 44, No, 3, Aug. 1998.

Lee, Dong-Ho et al., "HDTV Video Decoder Which Can Be Implemented With Low Complexity," IEEE International Conference on Consumer Electronics, pp. 6-7, 1994.

Blinn, Jim: Jim Blinn's Corner Dirty Pixels; publication; 1998; pp. 179-190; Chapter Sixteen; Morgan Kaufmann Publishers, Inc.; San Francisco, CA, USA.

Foley, James D., et al; Computer Graphics: Principles and Practice; publication, 1996, 1990; The Systems Programming Series, 4 pages, Second Edition in C; Addison-Wesley Publishing Company; U.S.A.

Power TV, Inc., Eagle. TM. Graphics-Audio Media Compositor Data Sheet, Version 1.7, Feb. 27, 1997.

* cited by examiner

GRAPHICS LAYER REDUCTION FOR VIDEO COMPOSITION

RELATED APPLICATIONS

This patent application makes reference to, claims priority to and claims benefit from U.S. Provisional Patent Application Ser. No. 60/513,276, entitled "Graphics Layer Reduction for Video Composition," filed on Oct. 22, 2003, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In video systems where graphics are added to video content, there may be a video layer and a graphics layer on top of the video layer. The video layer may come from a television (TV) source, and the graphics layer may be used to add information such as, for example, a user guide or some kind of a user-graphical interface such as a TV menu. In more sophisticated video systems, there may be graphics added on top of the video, as well as, graphics below the video. For example, adding a user guide on top of the video and a still background behind the video.

Outputting the layers as one output onto a display such as, for example, a monitor, requires blending the layers into one stream of data. The process of blending the layers together is known as graphics blending or graphics and video compositing.

A system with graphics and video layers may be viewed as a planar system with planes composed of the different layers. A low-end system consists of only one graphics layer and one video layer. A higher-end system consists of at least one graphics layer above the video layer, and at least one graphics layer below the video layer.

The way to blend the layers is generally done from the bottom up. So in a system with three layers, for example, the blending is done by blending the bottom graphics layer with the video layer, which results in a new blended layer, which may then be blended with the top graphics layer to get a composite image to output to the display.

Each layer of graphics, or the layer of video is composed of a buffer and an alpha. The buffer is a region of the memory in the system that contains pixels of the layer. Alpha is the blend factor of a layer and it indicates how much to blend of that layer with the layer below it. The value of alpha ranges from 0 to 1, inclusive. For video there alpha value can be the same for the whole layer or per pixel. Whereas with graphics, each pixel may have a different alpha value.

For example, if a system has two layers, a graphics layer on the top and a video layer below it, the buffer and the alpha for the graphics and the video layer would be, $B_t$, $A_t$, $B_b$, and $A_{bs}$, respectively. Blending the two layers together yields the following:

$$B_{tb} = A_t B_t + (1-A_t)B_b \qquad (1)$$

Where $B_{tb}$ is the buffer for the blended layer. If $A_t$ is 1, then when blending the graphics with the video below it, all that is seen is entirely graphics, so an alpha value of 0 implies complete transparency. If $A_t$ is 0, then when blending the graphics with the video below it, all that is seen is entirely video, so an alpha value of 1 implies complete opaqueness.

In most systems, alpha is an 8-bit number ranging from 0 to 1, inclusive. So there are 256 levels of transparency ranging from complete transparency to complete opaqueness.

In a more complex system, with graphics layers above and below the video layer, things may get more complex as well. For example, a system may have a graphics layer on top of the video layer, with buffer $B_1$, and alpha $A_1$, the video layer with buffer $B_V$ and alpha $A_V$, and a graphics layer below the video layer, with buffer $B_2$ and alpha $A_2$. Applying equation (1) above, blending the video and the graphics layer below it yields:

$$B_{V2} = A_V B_V + (1-A_V)B_2 \qquad (2)$$

Where $B_{V2}$ is the buffer for the blended bottom layer. Then blending the top graphics layer with the blended bottom layer yields:

$$B_{V3} = A_1 B_1 + (1-A_1)B_{V2} \qquad (3)$$

Where $B_{V3}$ is the buffer for the three blended layers. Expanding and re-arranging equation (3) after applying equation (2) yields:

$$B_{V3} = A_V(1-A_1)B_V + A_1 B_1 + (1-A_1)(1-A_V)B_2 \qquad (4)$$

Equation (4) above illustrates the calculation required to blend two layers of graphics with one layer of video. In more complex systems, there may be several layers of graphics above a layer of video, and several layers of graphics below the layer of video. In such systems, the graphics layers on top may be blended together into one top graphics layer, the graphics layers below may be blended together into one bottom graphics layer, then the top layer, video layer, and bottom layer, may be blended together according to equation (4).

In video systems, hardware that performs the calculations for compositing needs to read all three layers simultaneously, with the video, which is streaming data, and output the result onto the monitor in real-time, which can get bandwidth-expensive. The compositing process can also be hardware expensive when two graphics layers are read out of the memory, and calculations are made to accommodate streaming video data. Problems may be seen sometimes on a personal computer (PC), for example, when moving a window, a portion of the screen that was covered by the window may remain blank for a few seconds, because the graphics engine may take time to respond and do all the blending to accommodate the new graphics layers.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system and method that blends graphics layers and a video layer, wherein the graphics layers are stored in a memory. The method may comprise retrieving the graphics layers from the memory; blending the graphics layers; storing the blended graphics layers in the memory; reading the stored blended graphics layers from the memory; and combining the blended graphics layers with a streaming video layer. In an embodiment of the present invention, the blended graphics layers and the streaming video may be combined in raster format. The combined graphics and video may then be output onto a display device.

In an embodiment of the present invention, at least a portion of the graphics layers may be above the video layer and at least a portion of the graphics layers may be below the video layer. Blending the graphics layers may comprise blending the at least a portion of the graphics layers above the video layer into a top graphics layer; blending the at least a portion of the graphics layers below the video layer into a bottom graphics layer; and blending the top graphics layer and the bottom graphics layer into one graphics layer.

The system comprises a memory and at least one processor capable of performing the method that blends graphics layers and a video layer, wherein the graphics layers are stored in a memory.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention generally relate to the field of graphics and video compositing. Specifically, the present invention relates to the compositing of graphics layers appearing both, above and below a video layer, and to the reduction of graphics layers in video compositing.

Figure 1:
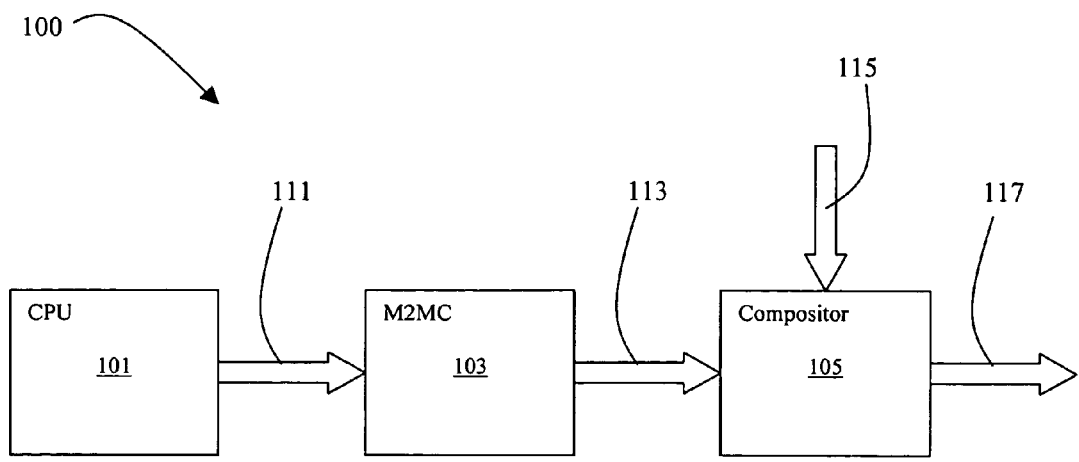
FIG. 1 illustrates a block diagram of an exemplary system for compositing graphics and video, in accordance with an embodiment of the present invention.

FIG. 1 illustrates a block diagram of an exemplary system 100 for compositing graphics and video, in accordance with an embodiment of the present invention. In an embodiment of the present invention, the system 100 may comprise a central processing unit (CPU) 101, a memory-to-memory (M2MC) compositor 103, and a graphics-video compositor 105. The CPU 101 may generate graphics objects 111 and store them in a memory unit. The memory-to-memory compositor 103 may then read the graphics objects 111 and combine them into one graphics object 113. The memory-to-memory compositor 103 may combine two or more graphics objects 111.

The combined graphics object 113 may then be fed into the graphics-video compositor 105, which may also have a streaming video 115 coming into it. The graphics-video compositor 105 may be responsible for combining video with graphics that are being fed from a graphics feeder. The graphics-video compositor 105 may then mix the graphics object 113 and the streaming video 115, and output the result 117. In an embodiment of the present invention, the graphics object 113 and the streaming video 115 may be mixed in a raster format, i.e. pixel by pixel, as the video is output onto a display device.

Figure 2A:
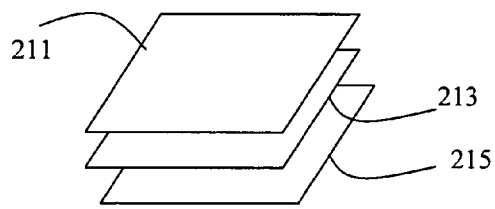
FIG. 2A illustrates three exemplary layers of graphics and video to be blended, in accordance with an embodiment of the preset invention.

FIG. 2A illustrates three exemplary layers of graphics and video to be blended, in accordance with an embodiment of the preset invention. Two layers of graphics, 211 and 215, one above and one below a video layer 213 may be combined together prior to blending with the video layer 213.

Figure 2B:
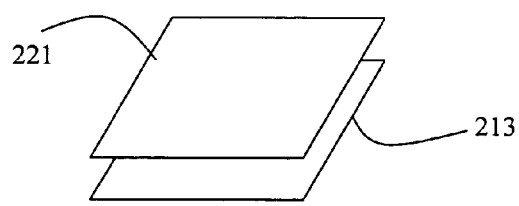
FIG. 2B illustrates two exemplary layers of graphics and video to be blended, in accordance with an embodiment of the preset invention.

FIG. 2B illustrates two exemplary layers of graphics and video to be blended, in accordance with an embodiment of the preset invention. The graphics layers, 211 and 215 of FIG. 2A, above and below the video layer 213 may be combined into one graphics layer 221, which may then be blended with the video layer 213 according to equation (1) above. As a result only one graphics layer 221 and one video layer 213 may be read out and outputted onto a display such as, for example, a monitor. In an embodiment of the present invention, the graphics layers may change with each video frame.

In an embodiment of the present invention, the graphics layers may be combined and treated as if they were one graphics layer above the video layer. In an embodiment of the present invention, the graphics layers may have different alpha for each pixel of a layer, but since the blending of the graphics layers may be done offline, there may be no effect on real-time processing and no delays in video display.

In an embodiment of the present invention, a combined graphics layer 221 may have a buffer $B_G$ and an alpha $A_G$, and a video layer 213 may have a buffer $B_V$ and alpha $A_V$. Combining the combined graphics layer 221 on top with the video layer 213 on bottom according to equation (1) yields:

$$B_{GV} = A_G B_G + (1 - A_G) B_V \quad (5)$$

Equation (4) above implies that $B_V$ is multiplied by $A_V(1-A_1)$, which yields:

$$A_G = 1 - A_V(1 - A_1) \quad (6)$$

Applying equation (6) to equation (5) yields:

$$B_{GV} = (1 - A_V(1-A_1))B_G + A_V(1-A_1)B_V \quad (7)$$

To match equation (7) and equation (4):

$$B_G = (A_1 B_1 + (1-A_1)(1-A_V)B_2)/(1 - A_V(1-A_1)) \quad (8)$$

As a result, equations (6) and (8) may be the alpha and the buffer of the combined graphics layer 221, respectively. In an embodiment of the present invention, the process of combining the graphics layers may be performed in the background, which may be done less expensively by consuming less bandwidth compared to blending a bottom graphics layer with the video layer above it, then blending the result with the top graphics layer. In such an embodiment, the real-time processing may also be reduced.

In an embodiment of the present invention, equation (6) may be computed by the M2MC in one pass. In another embodiment of the present invention, $A_1$ and $A_V$ may be constant, and the CPU may compute equation (6).

In an embodiment of the present invention, the combined graphics layer buffer ($B_G$) may depend on the alpha of the video layer ($A_V$), which may change from one frame to another. In such an embodiment, the combined graphics layer buffer may be updated. In another embodiment of the present invention, the alpha of the video layer may stay constant over several frames. In such an embodiment, the computation for the combined graphics layer may be done once and re-used as long as the graphics layers stay the same. In yet another embodiment of the present invention, the alpha of the video layer may be different from pixel to pixel within a frame. In such an embodiment, the additional computation may not have an effect on the real-time system, since the equations involving the alpha of the video layer may be done offline as part of the graphics operations in the CPU or the M2MC.

If the alpha factors for all the layers remain constant, equation (8) becomes of the form $K_1*B_1+K_2*B_2$, where $K_1$ and $K_2$ may need to be computed only once, and:

$$K_1 = A_1/(1-A_V(1-A_1)) \quad (9)$$

$$K_2 = (1-A_1)(1-A_V)/(1-A_V(1-A_1)) \quad (10)$$

$$B_G = K_1*B_1 + K_2*B_2 \quad (11)$$

However, if the alpha values are per pixel, then the values of $K_1$, and $K_2$ may change per pixel, and the division operation may be required per pixel. In an embodiment of the present invention, an alternative compositing equation may be used where equation (5) may be changed to the following:

$$B_{GV} = B_G + (1-A_G)B_V \quad (12)$$

Then equation (8) becomes:

$$B_G = A_1B_1 + (1-A_1)(1-A_V)B_2 \quad (13)$$

In such an embodiment, a division operation may not be required, and the processing cost may be further reduced compared to the processing cost in an embodiment that may have a division operation.

The video compositor may be set up either to compute equation (12) (when graphics feeder is in pre-multiply) or equation (5) (when graphics feeder is not in pre-multiply).

Equation (13) may be calculated by the M2MC. In an embodiment of the present invention, if $A_1$ and $A_V$ are constant, then $(1-A_1)(1-A_V)$ may be computed and turned into one constant value. As a result, equation (13) becomes:

$$B_G = A_1B_1 + A_KB_2 \quad (14)$$

In another embodiment of the present invention, if $A_1$ and $A_V$ are not both constant, then equation (13) may need to be done in two passes, where the first pass may compute an intermediate value $B_C$:

$$B_C = (1-A_V)B_2 \quad (15)$$

Then, the second pass may compute $B_G$:

$$B_G = A_1B_1 + (1-A_1)B_C \quad (16)$$

When equation (12) is calculated, the graphics feeder may be setup in "alpha pre-multiply" mode, which may allow having $B_G$ and not $A_GB_G$ as found in equation (5). $A_G$ may still be fed out by the graphics feeder, so that $(1-A_G)*B_V$ can be computed in the video compositor.

In an embodiment of the present invention, results of computations involving values that may not change may be kept and stored so that they are not re-computed. Stored values may be re-computed when inputs to the equations are made.

Figure 3A:
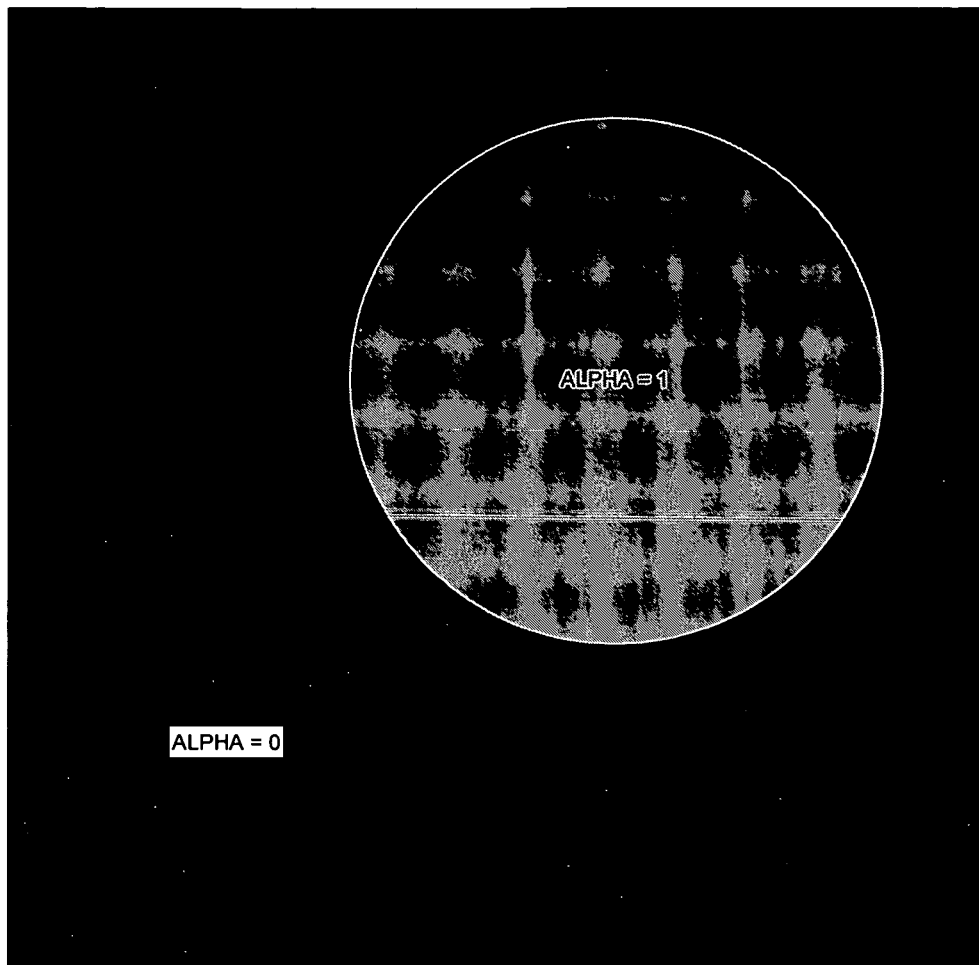
FIG. 3A illustrates an exemplary graphics layer, in accordance with an embodiment of the present invention.

FIG. 3A illustrates an exemplary graphics layer, in accordance with an embodiment of the present invention. The graphics layer 311 may be an upper graphics layer such as, for example, graphics layer 211 of FIG. 2A. The graphics layer 311 may comprises portions with different alpha values. For example, the entire graphics layer 311 may have an alpha value of 0 (completely transparent) except for an area in the shape of a circle having an alpha value of 1 (completely opaque).

Figure 3B:
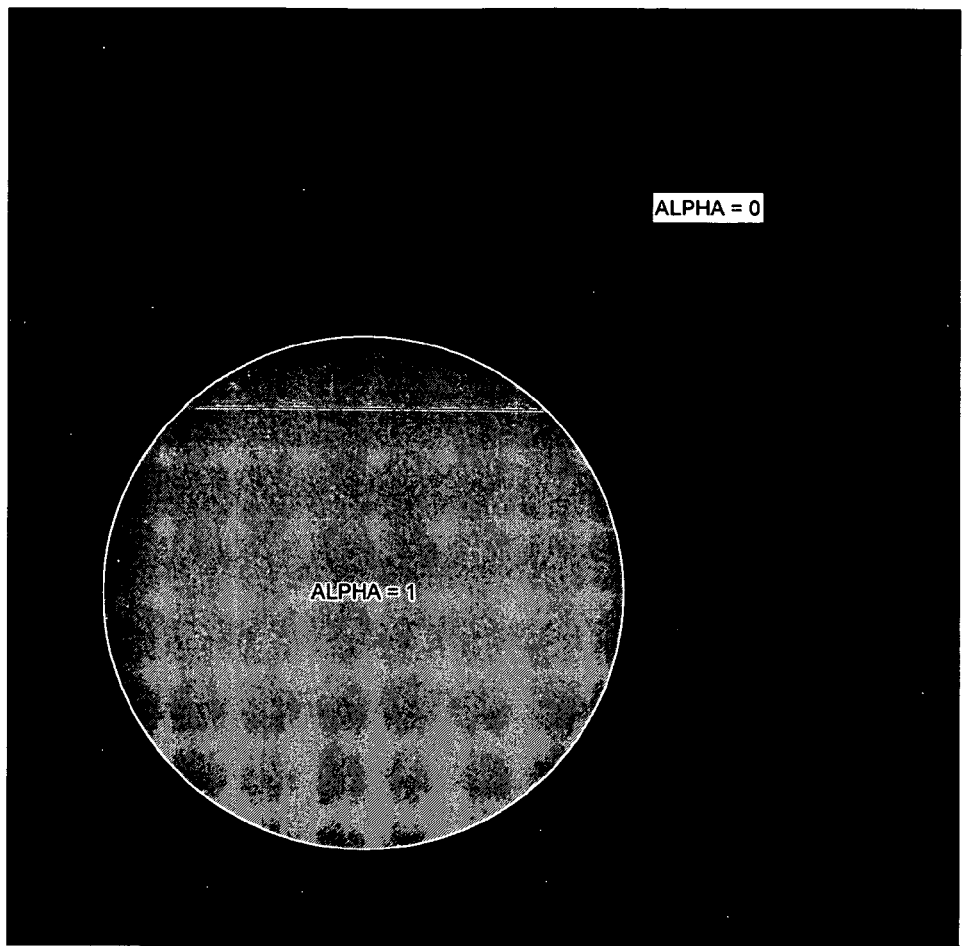
FIG. 3B illustrates another exemplary graphics layer, in accordance with an embodiment of the present invention.

FIG. 3B illustrates another exemplary graphics layer, in accordance with an embodiment of the present invention. The graphics layer 315 may be a lower graphics layer such as, for example, graphics layer 215 of FIG. 2A. The graphics layer 315 may comprises portions with different alpha values. For example, the entire graphics layer 315 may have an alpha value of 0 (completely transparent) except for an area in the shape of a circle having an alpha value of 1 (completely opaque), but at a different position than the circle with alpha of value 1 of the upper graphics layer 311.

Figure 3C:
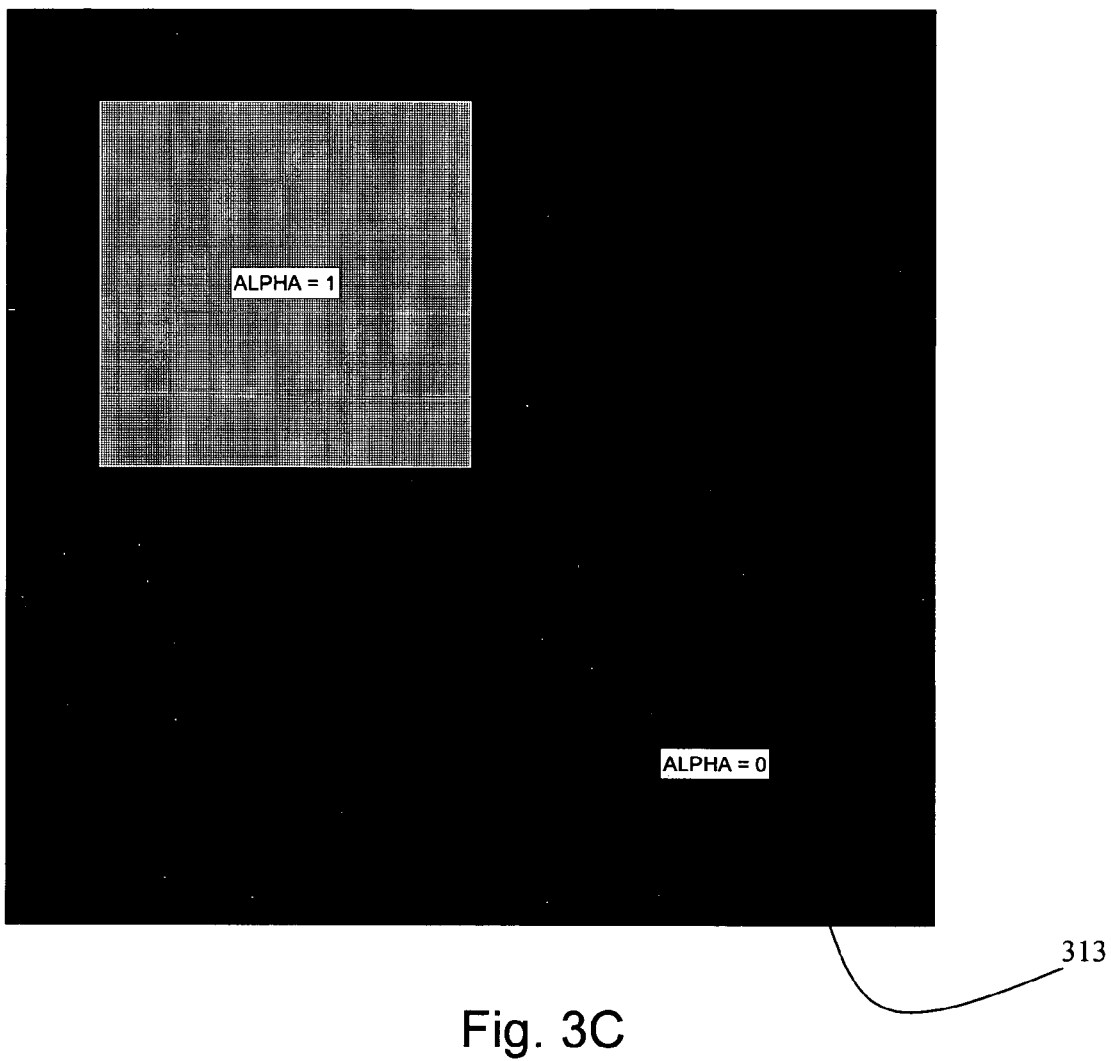
FIG. 3C illustrates an exemplary video layer, in accordance with an embodiment of the present invention.

FIG. 3C illustrates an exemplary video layer, in accordance with an embodiment of the present invention. The video layer 313 may be a video layer such as, for example, the video layer 213 of FIG. 2A. The video layer 313 may comprises portions with different alpha values. For example, the entire video layer 313 may have an alpha value of 0 (completely transparent) except for an area in the shape of a square having an alpha value of 1 (completely opaque).

Figure 3D:
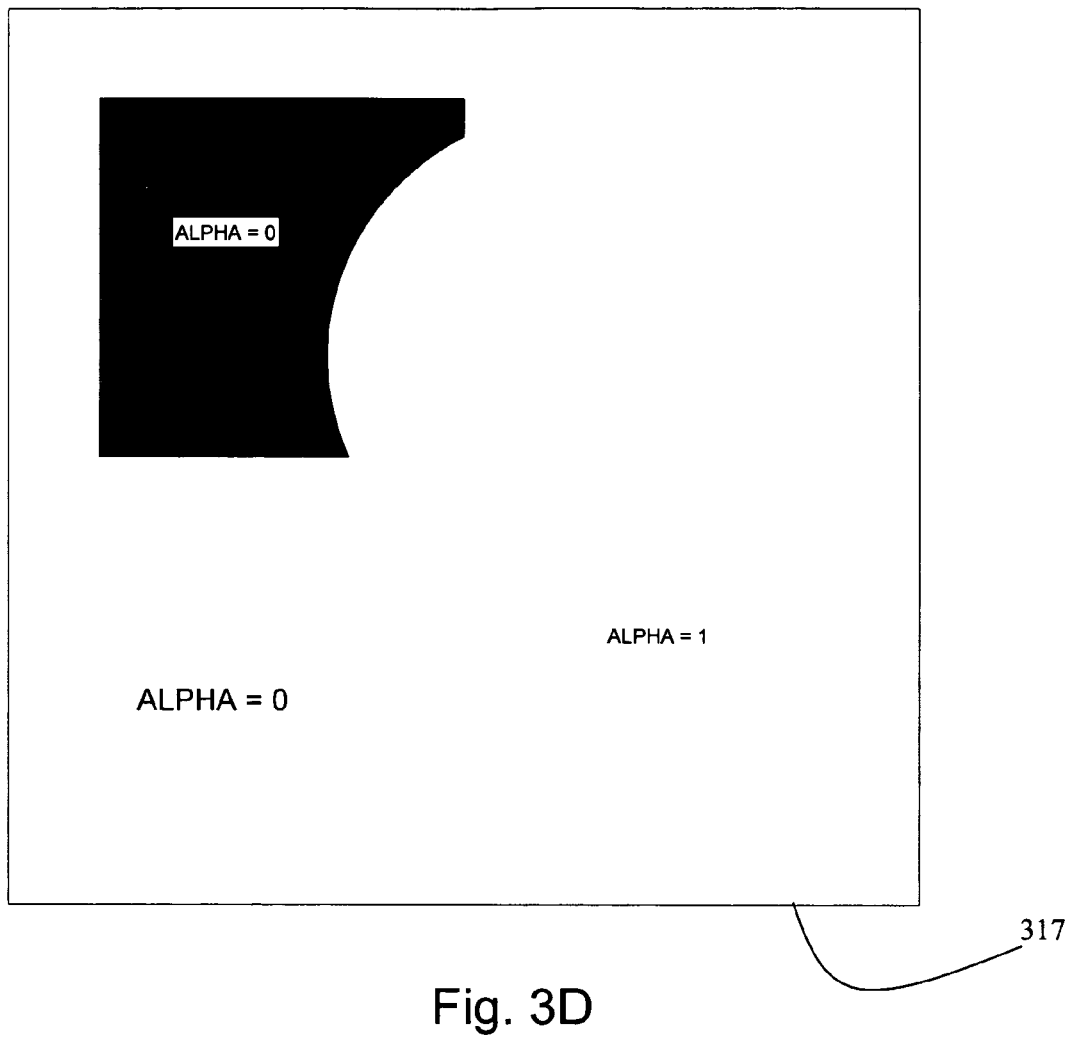
FIG. 3D illustrates an exemplary blended alpha plane, in accordance with an embodiment of the present invention.

In an embodiment of the present invention, the graphic layers 311 and 315 may be blended together and composited with the video layer 313. The alphas of the top graphics layer and the video layer may be used to compute the alpha plane $A_G$. FIG. 3D illustrates an exemplary blended alpha plane, in accordance with an embodiment of the present invention. The alphas of the graphics layer 311 and the video layer 313 may be blended to determine the alpha $A_G$ 317 of the blended layers.

Figure 3E:
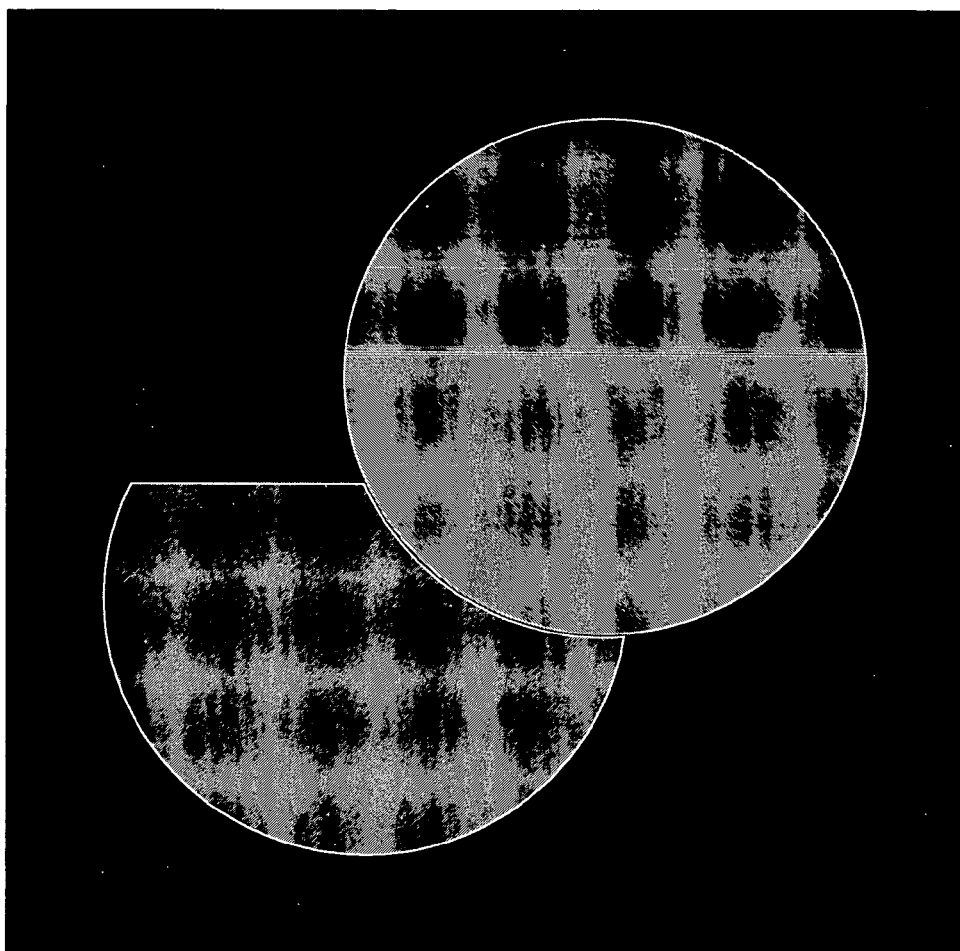
FIG. 3E illustrates an exemplary blended graphics color plane, in accordance with an embodiment of the present invention.

The colors of the graphics layers may then be blended together to compute the color plane $B_G$. The computation of $B_G$ may be done according to equation 16 above, which may also utilize the alpha of the video layer in the computation. FIG. 3E illustrates an exemplary blended graphics color plane, in accordance with an embodiment of the present invention. The blended graphics color plane $B_G$ 319 may be the result of blended the graphics layers 311 and 315 of FIG. 3A and FIG. 3B, respectively, in addition to the alpha of the video layer 313.

Figure 3F:
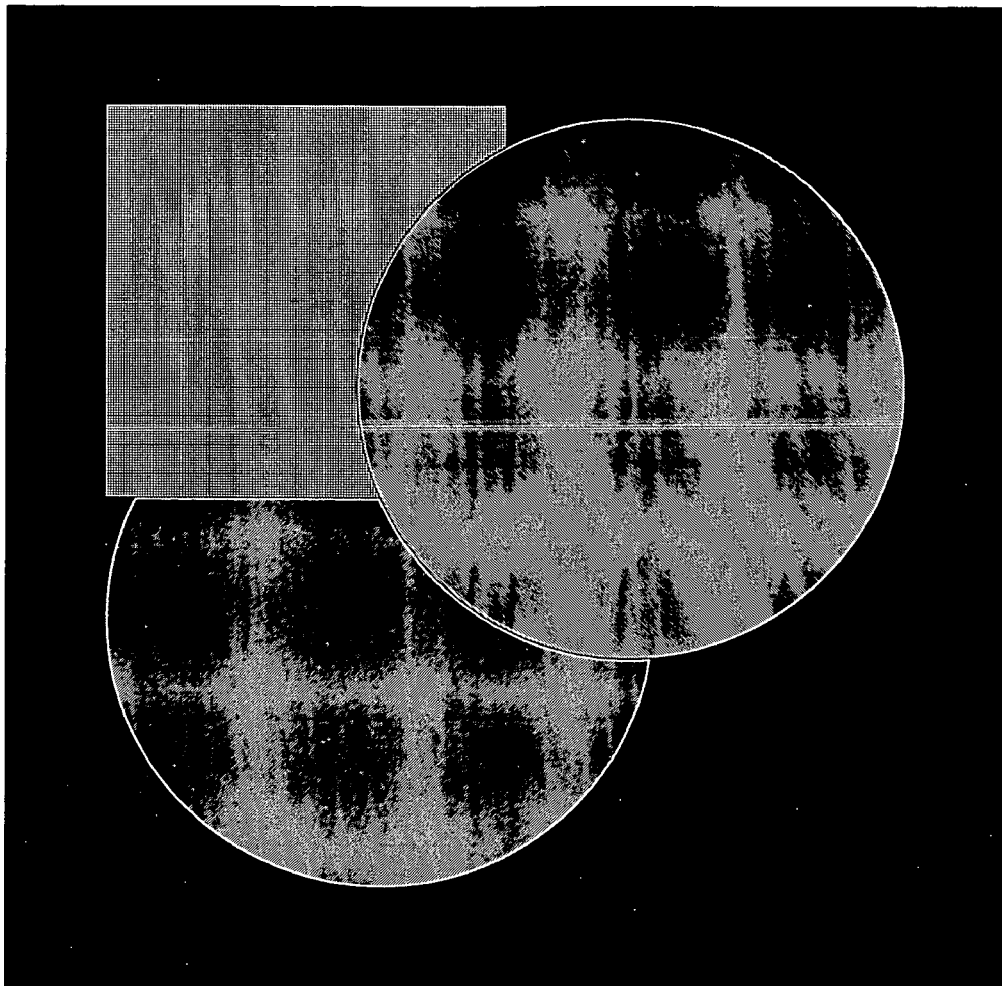
FIG. 3F illustrates exemplary composited graphics and video layers, in accordance with an embodiment of the present invention.

The blended graphics layer 319 may then be combined together with the video layer 313 of FIG. 3C, using the alpha $A_G$ 317, to get a graphics-video composition 321. FIG. 3F illustrates exemplary composited graphics and video layers, in accordance with an embodiment of the present invention. The output on a display may be for example the graphics-video composition 321, where the elements of the upper graphics layer 311 may appear above the elements of the video layer 313, and the elements of the lower graphics layer 315 may appear below the elements of the video layer 313.

Figure 4:
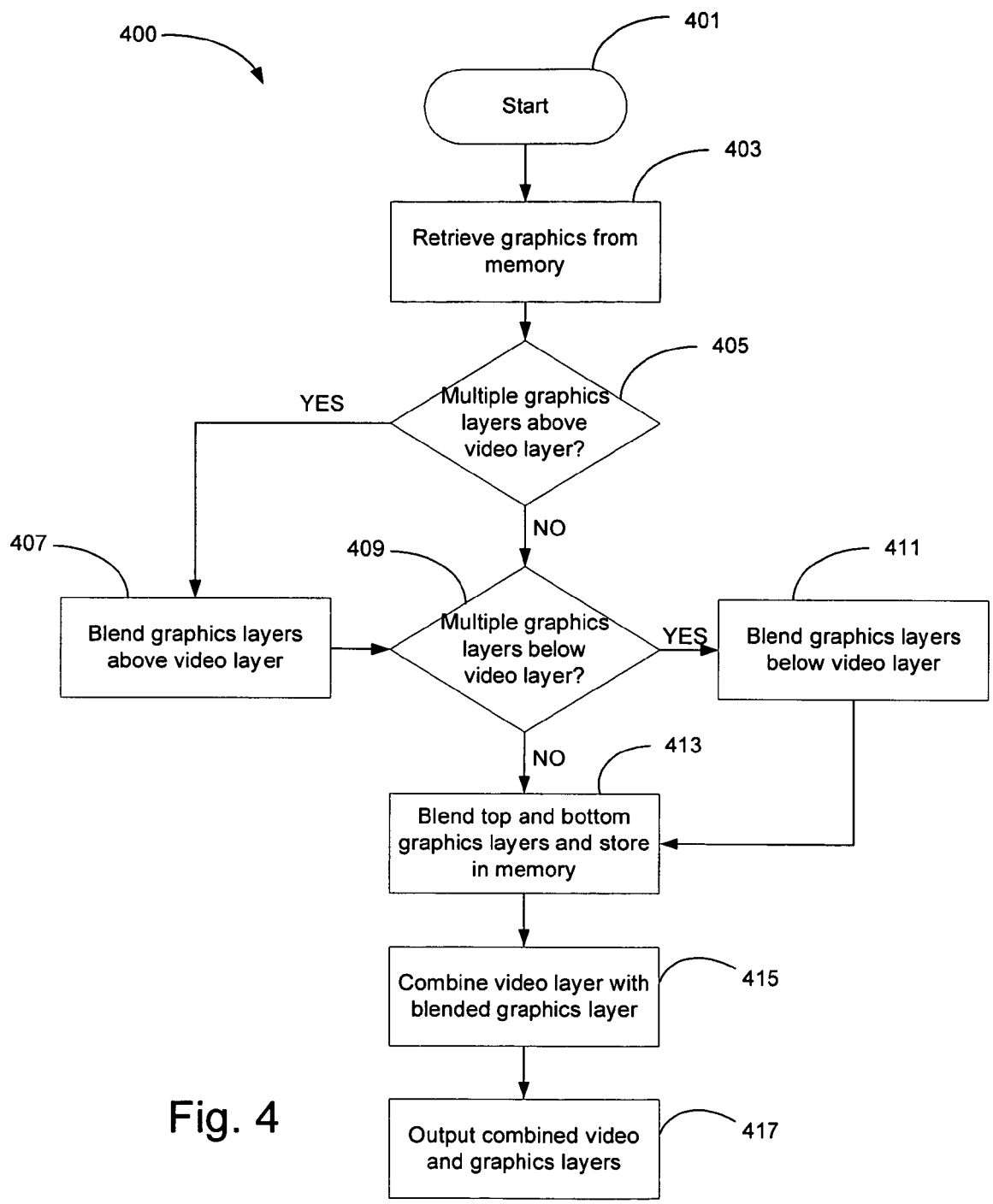
FIG. 4 illustrates a flow diagram of an exemplary method of compositing graphics layers and a video layer, in accordance with an embodiment of the present invention.

FIG. 4 illustrates a flow diagram of an exemplary method 400 of compositing graphics layers and a video layer, in accordance with an embodiment of the present invention. In an embodiment of the present invention, the graphics layers may appear both above and below the video layer. The method may start at a starting block 401, and at a next block 403 graphics may be retrieved from a memory. At a next block 405, it may be determined whether there are multiple graphics layers above the video layer. If it is determined that there is only one graphics layer above the video layer, the method may proceed to a next block 409, where it may be determined whether there are multiple graphics layers below the video layer.

If there are multiple graphics layers above the video layer, then at a block 407, the graphics layers above the video layer may be blended together into one top graphics layer. At a next block 409, it may be determined whether there are multiple graphics layers below the video layer.

If at the block 409, it is determined that there is only one graphics layer below the video layer, the method may proceed to a next block 413. If there are multiple graphics layers below the video layer, then at a block 411, the graphics layers below the video layer may be blended together into one bottom graphics layer, the method may then proceed to a next block 413. At a next block 413, the top graphics layer and the bottom graphics layer may be blended together into one graphics layer, which may then be stored back in memory. As the video streams in, for each image, the video layer may be then combined with the appropriate blended graphics layer at a next block 415. Then at a next block 417, the combined graphics and video layers may be output on a display device.

In an embodiment of the present invention, the method of the flow diagram of FIG. 4 may be performed utilizing a system such as, for example, the system 100 of FIG. 1. The system 100 may be a portion of a system such as, for example, a video decoder system.

Figure 5:
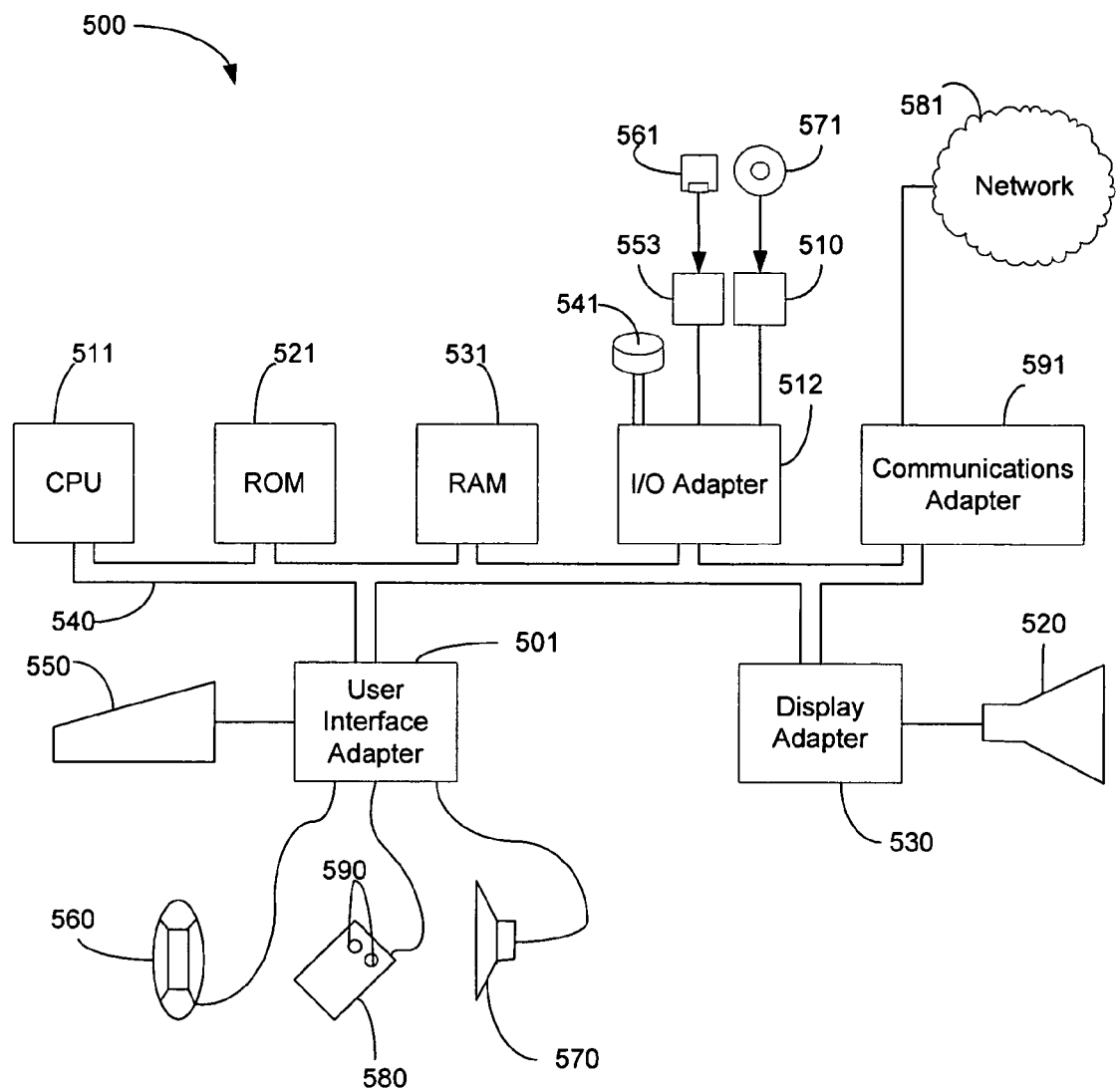
FIG. 5 illustrates an exemplary computer system, in accordance with an embodiment of the present invention.

FIG. 5 illustrates an exemplary computer system 500, in accordance with an embodiment of the present invention. A central processing unit (CPU) 511 may be interconnected via a system bus 540 to a random access memory (RAM) 531, a read only memory (ROM) 521, an input/output (I/O) adapter 512, a user interface adapter 501, a communications adapter 591, and a display adapter 530. The I/O adapter 512 may connect to the bus 540 peripheral devices such as hard disc drives 541, floppy disc drives 553 for reading removable floppy discs 561, and optical disc drives 510 for reading removable optical discs 571 (such as a compact disc or a digital versatile disc). The user interface adapter 501 may connect to the bus 540 devices such as a keyboard 550, a mouse 580 having a plurality of buttons 590, a speaker 570, a microphone 560, and/or other user interface devices such as a touch screen device (not shown). The communications adapter 591 may connect the computer system to a data processing network 581. The display adapter 530 may connect a monitor 520 to the bus 540.

An alternative embodiment of the present invention may be implemented as sets of instructions resident in the RAM 531 of one or more computer systems 500 configured generally as described in FIG. 1. Until required by the computer system 500, the sets of instructions may be stored in another computer readable memory, for example in a hard disc drive 541, or in removable memory such as an optical disc 571 for eventual use in an optical disc drive 510, or in a floppy disc 561 for eventual use in a floppy disc drive 553. The physical storage of the sets of instructions may physically change the medium upon which it is stored electrically, magnetically, or chemically so that the medium carries computer readable information.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that blends graphics layers and a video layer, wherein the graphics layers are stored in a memory, the method comprising:
   retrieving a plurality of graphics layers from the memory;
   blending the plurality of graphics layers, using an alpha value of only one of the graphics layers;
      blending the at least a portion of the graphics layers above the video layer into a top graphics layer;
      blending the at least a portion of the graphics layers below the video layer into a bottom graphics layer; and
      blending the top graphics layer and the bottom graphics layer into one graphics layer;
   storing the blended graphics layers in the memory;
   reading the stored blended graphics layers from the memory; and
   and combining the blended graphics layers with a streaming video layer; and
   wherein at least a portion of the graphics layers is above the video layer and at least a portion of the graphics layers is below the video layer.

2. The method according to claim 1 further comprising outputting the combined graphics and video onto a display device.

3. The method according to claim 1 further comprising combining the blended graphics layers and the streaming video in raster format.

4. The method according to claim 1 wherein each layer comprises a buffer and an alpha.

5. The method according to claim 4 wherein the buffer contains pixel values for the layer.

6. The method according to claim 4 wherein the alpha is constant for the whole layer.

7. The method according to claim 6 wherein the alpha is different for each pixel.

8. A system that blends graphics layers and a video layer, wherein the graphics layers are stored in a memory, the system comprising:
   a memory;
   at least one processor capable of retrieving a graphics layers from the memory;
   the at least one processor capable of blending the graphics layers, wherein the blending the graphics layers comprises:
      the at least one processor capable of blending the at least a portion of the graphics layers above the video layer into a top graphics layer;

the at least one processor capable of blending the at least a portion of the graphics layers below the video layer into a bottom graphics layer; and the at least one processor capable of blending the top graphics layer and the bottom graphics layer into one graphics layer;

the at least one processor capable of storing the blended graphics layers in the memory;

the at least one processor capable of reading the stored blended graphics layers from the memory;

the at least one processor capable of combining the blended graphics layers with a streaming video layer; and the at least one processor capable of combining the blended graphics layers and the streaming video in raster format; wherein at least a portion of the graphics layers is above the video layer and at least a portion of the graphics layers is below the video layer.

9. The system according to claim 8 further comprising the at least one processor capable of outputting the combined graphics and video onto a display device.

10. The system according to claim 8 wherein each layer comprises a buffer and an alpha.

11. The system according to claim 8 wherein the buffer contains pixel values for the layer.

12. The system according to claim 10 wherein the alpha is constant for the whole layer.

13. The system according to claim 10 wherein the alpha is different for each pixel.

14. A computer-readable memory having stored thereon, a computer program having at least one code section that blends graphics layers and a video layer, wherein the graphics layers are stored in a memory, the at least one code section being executable by a computer for causing the computer to perform steps comprising: retrieving graphics layers from the memory; blending the graphics layers, wherein the code for blending the graphics layers comprises:

code for blending the at least a portion of the graphics layers above the video layer into a top graphics layer;

code for blending the at least a portion of the graphics layers below the video layer into a bottom graphics layer; and code for blending the top graphics layer and the bottom graphics layer into one graphics layer;

storing the blended graphics layers in the memory; reading the stored blended graphics layers from the memory; and combining the blended graphics layers with a streaming video layer; and wherein at least a portion of the graphics layers is above the video layer and at least a portion of the graphics layers is below the video layer.

15. the computer-readable memory according to claim 14 further comprising code for outputting the combined graphics and video onto a display device.

16. The computer-readable memory according to claim 14 further comprising code for combining the blended graphics layers and the streaming video in raster format.

17. The computer-readable memory according to claim 14 wherein each layer comprises a buffer and an alpha.

18. The computer-readable memory according to claim 17 wherein the buffer contains pixel values for the layer.

19. The computer-readable memory according to claim 18 wherein the alpha is constant for the whole layer.

20. The computer-readable memory according to claim 17 wherein the alpha is different for each pixel.

21. The system of claim 1, wherein the blending the graphics layers comprises blending only graphics layers.

22. The system on claim 8, wherein the blending the graphics layers comprises blending only graphics layers.

23. The system of claim 14, wherein the blending the graphics layers comprises blending only graphics layers.

* * * * *

UNITED STATES PATENT AND TRADEMARK OFFICE
CERTIFICATE OF CORRECTION

| | |
|---|---|
| PATENT NO. | : 8,063,916 B2 |
| APPLICATION NO. | : 10/961876 |
| DATED | : November 22, 2011 |
| INVENTOR(S) | : Herrick et al. |

It is certified that error appears in the above-identified patent and that said Letters Patent is hereby corrected as shown below:

Column 10, Line 15, replace "the" with "The"

Column 10, Line 29, replace "system" with "method"

Column 10, Line 31, replace "on" with "of"

Signed and Sealed this
Twenty-eighth Day of August, 2012

David J. Kappos
*Director of the United States Patent and Trademark Office*